US006556832B1

(12) United States Patent
Soliman

(10) Patent No.: US 6,556,832 B1
(45) Date of Patent: Apr. 29, 2003

(54) METHOD AND APPARATUS FOR EVALUATION OF POSITION LOCATION PERFORMANCE

(75) Inventor: Samir S. Soliman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/497,718

(22) Filed: Feb. 4, 2000

(51) Int. Cl.[7] ................................................. H04Q 7/20
(52) U.S. Cl. .................. 455/456; 455/918; 342/357.06; 342/357.07
(58) Field of Search ................................. 455/456, 422, 455/403, 414, 418, 421, 423, 424, 448, 186.1, 454, 440; 342/457, 357.06, 357.09–357.12

(56) References Cited

U.S. PATENT DOCUMENTS

| | | | | |
|---|---|---|---|---|
| 5,550,976 A | * | 8/1996 | Henderson et al. | 707/10 |
| 5,561,841 A | * | 10/1996 | Markus | 455/422 |
| 5,710,758 A | * | 1/1998 | Soliman et al. | 370/241 |
| 6,144,338 A | * | 11/2000 | Davies | 342/357.13 |
| 6,218,983 B1 | * | 4/2001 | Kerry et al. | 342/149 |
| 6,249,252 B1 | * | 6/2001 | Dupray | 342/450 |
| 6,393,294 B1 | * | 5/2002 | Perez-Breva et al. | 455/456 |

OTHER PUBLICATIONS

Papadoglou, et al., "Short Message Service Link for Automatic Vehicle Location Reporting", IEE, vol. 35, No. 11 May 1999, pps. 876–877.

Morley, et al., "Improved Location Estimation with Pulse–Ranging in Presence of Shadowing and Multipath excess–delay Effects", IEE vol. 31, No. 18, Aug. 1995, pps. 1609–1610.

Pent, et al., "Method for Postioning GSM Mobile Stations using Absolute time Delay Measurements", IEE vol. 33, No. 24, Nov. 1997, pps. 2019–2020.

* cited by examiner

*Primary Examiner*—William Trost
*Assistant Examiner*—Congvan Tran
(74) *Attorney, Agent, or Firm*—Philip Wadsworth; Charles D. Brown; Bruce W. Greenhaus

(57) ABSTRACT

Several different approaches may be taken to adding mobile unit position location capability to a system for wireless communications. These approaches may include terrestrial techniques as well as satellite-based techniques. An apparatus is disclosed whereby different such approaches may be evaluated and compared in the context of a particular existing or proposed system for wireless communications.

31 Claims, 7 Drawing Sheets

METHOD AND APPARATUS FOR EVALUATION OF POSITION LOCATION PERFORMANCE

BACKGROUND OF THE INVENTION

I. Field of the Invention

This invention relates to network planning and deployment of position location networks. More specifically, this invention relates to evaluating the performance of a system for position location services.

II. Description of Related Art and General Background

Wireless systems for mobile communications include such examples as cellular telephone networks, broadband Personal Communication Services (PCS), wireless local-area networks (LANs), satellite communication systems, and two-way radio systems. These systems include mobile units that may be telephone or radio handsets, vehicle-based transceivers, wireless data modems, or even semi-fixed units such as wireless local loop (WLL) stations. Many such systems also have an infrastructure including one or more base station units whose locations are fixed and which communicate with the mobile units and possibly also with each other and/or an external network. In a cellular telephone network, for example, the base station units provide an interface between the mobile units and the public switched telephone network, communicate with registries to perform authentication and billing functions, and may also interact with each other to perform call management and handoff functions.

It is desirable to augment certain wireless systems for mobile communications by adding the capability to locate the position of a particular mobile unit. One reason is a regulation promulgated by the Federal Communications Commission (Docket No. 94-102, Third Report and Order adopted Sep. 15, 1999, released Oct. 6, 1999) which requires all cellular carriers in the United States to be able to locate the position of a cellular telephone making a 911 call within 50 meters for 67 percent of calls and within 150 meters for 95 percent of calls by October 2001. Other uses for position location capability in wireless communications systems include value-added consumer features such as navigation and vehicle fleet management support.

Several different approaches to position location may be implemented. These approaches include but are not limited to terrestrial methods, Global Positioning System (GPS) methods, and hybrids of terrestrial and GPS methods. The relative performances of these approaches as applied to any particular system for wireless communications will depend to some extent on the characteristics of that system and of the region where the system is deployed. Hence, it is desirable to be able to evaluate the performance of one or more such approaches within a system before a commitment is made to adopt or implement any particular approach. A need therefore exists for a method or apparatus that may be used to evaluate the performance of an existing or proposed wireless communications system with respect to position location. It is also desirable to be able to compare the performances of several different approaches to position location, whether during the planning and design stages for a new system or during upgrading or troubleshooting of an existing system.

SUMMARY OF THE INVENTION

In an apparatus according to an embodiment of the invention, a structured collection of information (such as one or more among databases, arrays, matrices, or compilations) is provided which relates to a target region. At least one processing unit is also provided which processes at least a part of the structured collection of information. Information is thereby produced by the processing unit or units that relates to the position of a mobile or stationary wireless unit within the target region.

DETAILED DESCRIPTION OF THE INVENTION

Figure 1:
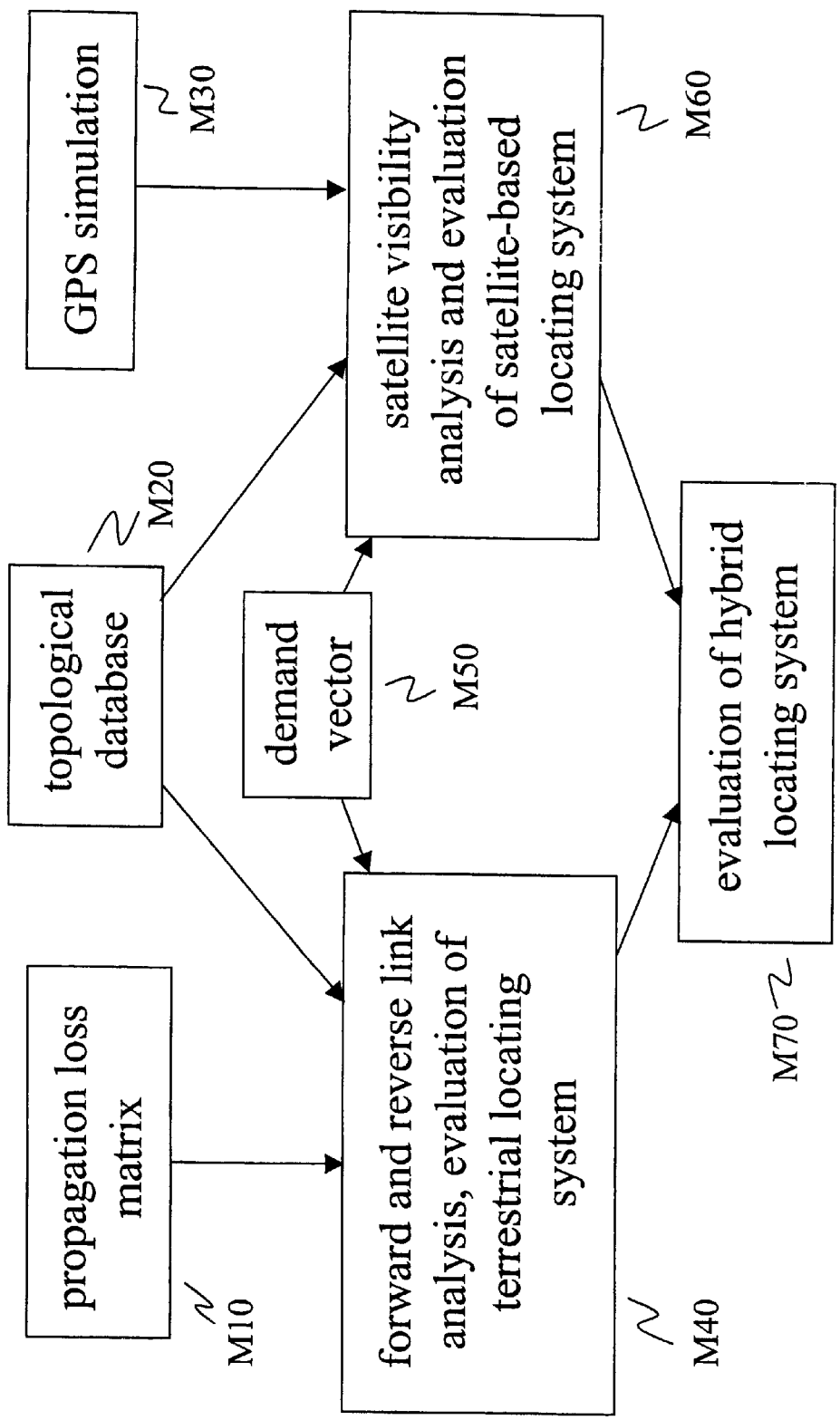
FIG. 1 is a block diagram of an apparatus according to an embodiment of the invention.

A method or apparatus according to an embodiment of the invention may be used to evaluate the performance of several different approaches to position location of a wireless unit. Such a method or apparatus may be used, for example, during the design, deployment, upgrading, or troubleshooting of a system for wireless communications.

Although particular details of implementation may be described in relation to a code-division multiple access (CDMA) cellular telephone network, the invention may be applied to any existing or proposed system for wireless communications, regardless of whether communications are conducted over analog or digital links and regardless of whether access to the wireless channel conforms to TDMA, FDMA, CDMA, or another multiple-access scheme.

It should also be understood that the term "location" may be used herein in an active sense, indicating the act of defining a physical position of an object as in the phrase "wireless position location," or in a passive sense, indicating the physical point where an object exists as in the phrase "the location of the base station unit."

Techniques for wireless position location may be broadly divided into three categories: terrestrial, GPS, and hybrids of terrestrial and GPS-based approaches. Examples from these three categories include:

Overlay infrastructure-based approach: receivers and/or antennas dedicated to position location are added to (or 'overlaid onto') the system at fixed locations. It is possible but not necessary for these receivers to be collocated with any existing base station units.

Integrated infrastructure-based approach: additional processing functions are added to the system to support position location, but no receivers or antennas are added.

Stand-alone mobile-unit-based satellite approach: each mobile unit calculates its own position from signals received from positioning satellites.

Network-assisted satellite approach: each mobile unit receives aiding signals from the terrestrial network and positioning signals from positioning satellites.

Network-based satellite approach: each mobile unit receives aiding signals from the terrestrial network, measures positioning data from positioning satellites, and forwards data relating to these signals to the infrastructure. One or more processing units within the infrastructure then determine the mobile unit's position from this data.

Hybrid approach: each mobile unit receives aiding signals from the terrestrial network and positioning data from both terrestrial network and positioning satellites. The positioning data may be used by the mobile unit to calculate position or may be sent to one or more processing units within the infrastructure to determine the position of the wireless unit.

Evaluation of one or more such approaches is performed on the basis of a number of performance measures. Results of the evaluations may be displayed and/or stored in several different formats and may also be combined with demographic information for weighting purposes.

Database

An apparatus according to an embodiment of the invention operates in the context of a target region which corresponds to a physical area where at least a portion of an existing or proposed wireless communications system is deployed. Depending on the nature of the communications system and its desired position location ability, the target region may be a geographical area (e.g. for a cellular telephone network) or a portion of a building or other structure (e.g. for a wireless LAN) and may include both indoor and outdoor areas.

Such an apparatus includes a structured collection of information about the target region and the existing or proposed infrastructure. This collection may include one or more databases which store information such as:

physical information about the target region, such as terrain topology and quality, locations and characteristics of buildings and other artificial structures and features, and other information relating to interactions between the region and propagating signals;

information about the infrastructure in the target region, such as the number, location, height, and configurations and other characteristics of existing or proposed base station units;

demographic information related to the target region or to the probability that a mobile unit will be found at a particular location, such as distribution of population or customers, land-use or zoning maps, and network use density data.

Additionally, the target region is represented within the apparatus as a number of discrete bins in either two dimensions (e.g. sampled by longitude and latitude) or three dimensions (e.g. sampled by longitude, latitude, and altitude). In other words, each bin corresponds to an area element (or a volume element) of the target region. For cellular telephone networks, bin sizes of 30 to 100 meters in each dimension have been found to work well. For networks within more limited areas, a correspondingly smaller bin size may be desired. Note that the bins need not be all of the same size or number of dimensions, as it may be desired to model certain areas within the target region in greater detail than others. This representation may be generated by the apparatus (for example, following selection of the target region by the user) or may be loaded as a separate item or as a part of the structured collection of information. As described below, a set of values calculated for each bin (typically with respect to the center point of the bin) provides a basis for predicting the quality of position location capability at that position for a particular approach. An apparatus according to an embodiment of the invention may include one or more processing units for performing the calculation of these values and for other computations as discussed herein.

Preprocessing

In using an apparatus according to an embodiment of the invention, it may be desirable to obtain a composite propagation loss matrix for the target region. This matrix, which may be two- and/or three-dimensional, represents a degree of propagation loss for a signal traveling between each base station and various locations within the target region. Such a matrix may be loaded as part of the structured collection of information; alternatively, it may be generated with a network analysis tool such as QEDesign or according to the description in U.S. Pat. No. 5,710,758, issued Jan. 20, 1998 and entitled "WIRELESS NETWORK PLANNING TOOL," which patent is assigned to the assignee of the present invention. In constructing this matrix, one or more path loss models may be used, selected, or combined: including, for example, a free-space loss model, short-term models such as Ricean, Rayleigh (for outdoor environments) or Nakagami (for indoor environments), or long-term models such as log-distance or those developed by Okumura, Hata, Lee, and others. Many such suitable path loss models are known in the art, being described in such documents as Chapter 2 of *Mobile Radio Communications,* edited by Raymond Steele and published by John Wiley and IEEE Press, New York, 1992. Diffraction loss models may also be used, whether alone or in combination with other models such as those referenced herein. As the representation of the target region may contain bins of different size and/or number of dimensions, likewise certain values of the composite propagation loss matrix may correspond to areas of different size or number of dimensions than others, although there need not be a one-to-one correspondence between the areas represented by the composite propagation loss matrix values and the bins of the target region representation. Similarly, different path loss models may be used for different parts of the matrix.

Similarly, it is may be useful to obtain or generate a demand vector for the target region. This vector indicates an actual or projected demand for position location services at various locations within the target region. Such demand information may be imported from another design tool (such as QEDesign), downloaded from another source, or specified by the user in such forms as:

Uniform demand, wherein demand information is specified generally as, e.g., a uniform value for the entire region;

A custom demand map, containing a demand value for each bin; or

Land-use and land-use Erlang mapping, wherein each land-use category is mapped to a demand in Erlang/km$^2$. A land-use map can then be used with a land-use-Erlangs mapping table to specify demand in the target region.

Other sources for demand information include network use records, population density maps, surveys, and other demographic information. If the apparatus will not access demand information until a later stage such as the display stage, then the loading or generation of this vector may be delayed, thus possibly reducing random-access storage requirements.

One measure used in evaluating the availability (or yield) of a position location system using terrestrial approaches is the sensitivity $S_i$ of a base station unit i. This measure is useful in determining whether a signal transmitted by a mobile unit at a particular position may be received sufficiently strongly by a particular base station unit. Additionally, sensitivity of the wireless unit when receiving satellite signals may be relevant in satellite-based approaches to determine whether the wireless unit is able to acquire satellite positioning signals. In a CDMA network, for example, the sensitivity $S_i$ of a given base station unit may be characterized by the following expression:

$$S_i = 10 \log(kT_jR) + F_i + (E_b/N_t) - 10 \log(1-X), \quad (1)$$

where k is Boltzmann's constant ($1.38 \times 10^{-23}$ Joule/deg Kelvin), $T_j$ is receiver temperature in degrees Kelvin, R is data rate in symbols/s, $F_i$ is the receiver noise figure, X is the reverse link loading factor, and $E_b/N_t$ is the minimum ratio of energy per bit to noise power spectral density required to achieve the desired resolution and detection and false alarm probabilities. Note, however, that the invention is not limited to networks employing CDMA and may apply to any system for wireless communications.

In this particular expression for sensitivity, the first term represents receiver thermal noise, the second term represents receiver intrinsic noise (for an ideal receiver, $F_i=0$), and the third term represents the minimum signal-to-noise ratio (SNR) necessary to support the processing functions required by the position location process. The fourth term is specific to a CDMA system, although its analogue may be found in a sensitivity expression for any other system having several transmitters. As a default, a value of 50% (i.e. the current load, or number of mobile units active, is 50% of capacity) may be chosen as a default for X.

In an apparatus according to an embodiment of the invention, one or more sensitivity values from each base station unit may be loaded or generated before analysis of a particular position location approach begins. It is also noted that the theory of the Cramer-Rao bound implies that the variance of the error in estimating the location of the peak energy (which location may be relevant to the time of arrival of a signal) is inversely proportional to $E_b/N_t$.

Terrestrial Analysis and Evaluation

Terrestrial locating techniques offer some advantages over satellite-based approaches, such as better signal coverage indoors and comparatively easy access to equipment for repair and upgrading. Also, some terrestrial approaches may be implemented without modification to the mobile units. Although certain terrestrial approaches require hardware to be added to the infrastructure (e.g. in the form of overlay receivers and/or antennas that may or may not be collocated with the base station units), other approaches may be implemented that require only additional processing tasks to be performed with existing hardware.

A terrestrial locating system may operate on the basis of signal attenuation, angle of arrival (AOA), or time of arrival (TOA)/time difference of arrival (TDOA). Although the strict power control of a CDMA mobile transmitter supports the feasibility of position location based on signal attenuation, such approaches are disfavored because of the many reasons besides distance that may cause the attenuation of a signal. Similarly, the specialized nature of the antennas required to implement an AOA system with sufficient location accuracy will generally weigh in favor of a TOA or TDOA approach. Note, however, that a method or apparatus according to an embodiment of the invention may be used to evaluate any such system.

Another measure that may be used in evaluating the availability of a position location system using terrestrial approaches is the signal-to-noise ratio of a signal received from a base station unit i at a mobile unit. The measure is useful in determining whether a signal transmitted from the base station unit is visible at the position of the mobile unit.

Time Difference of Arrival (TDOA)

A signal transmitted by a mobile unit propagates at a speed of approximately 1,000 feet per microsecond. If the propagation time of the signal can be measured very accurately upon the signal's reception by a base station unit (i.e. the difference between the transmission time and the TOA is known to a high degree of accuracy), then the position of the mobile unit may be determined to lie along a circle whose radius is defined by the product of the propagation delay and the speed of light and whose center is the base station unit. As two such circles centered at different base station units will overlap at two points, one may see that the propagation time must be accurately measurable by three different base station units in order to support an unambiguous determination of a two-dimensional location. If three-dimensional location is desired, then the propagation time must be accurately measurable by four different base sites.

In many practical situations, clock inaccuracies will prevent the time of arrival from being known exactly, and a time difference of arrival (TDOA) technique may be used instead. Upon its reception at each base station unit, the signal is time stamped. By comparing the time stamps of one signal as received at a pair of base station units A and B, one branch of a hyperbolic curve (or surface) may be drawn such that every point on the branch lies a fixed distance further from base station unit A than from base station unit B, wherein this fixed distance is the product of the speed of light and the difference of the time stamps. By comparing pairs of time stamps among three different base stations, two different hyperbolic branches may be defined, and a unique two-dimensional position may be identified from their intersection. This method of location is one form of a technique called hyperbolic trilateration. Note that as with the propagation delay method discussed above, it is necessary to obtain measurements from four base station units in order to accurately locate a three-dimensional position. Clearly, either method requires the mobile unit to be visible to a number of base station units.

Reverse Link Analysis

In order to evaluate the performance of a terrestrial system (implementing a TDOA approach, for example), either or both of two different forms of analysis may be used. One form is reverse link analysis, which indicates whether the signal transmitted by the mobile unit is strong enough to reach the required number of base station units with sufficient strength to support the position location approach being investigated.

In order to determine whether a transmitter in a particular bin would be visible to a particular base station unit, one must determine the quality of the signal upon arrival, a subtask similar to one performed in the apparatus of U.S. Pat. No. 5,710,758 cited above. One possible criterion for this determination is maximum tolerable path loss $L_{max}$, which may be expressed as $$L_{max} = P_{max} - S_i \quad (2)$$

where $P_{max}$ is the maximum transmit power of a mobile unit at a position within this bin and $S_i$ is the sensitivity of the base station unit i (calculated as described above, for example). If the value from the composite propagation loss matrix which indicates an estimated path loss between that bin and base station unit i is less than $L_{max}$, then it will be presumed possible for base station unit i to receive a signal from a mobile station within this bin (in other words, a mobile unit transmitting with power $P_{max}$ from a position within that bin will be 'visible' to base station unit i).

Another possible criterion is effective radiated power (ERP) of the mobile unit, calculated as the level of power that must be transmitted in order for the signal to be received at a particular base station unit. The ERP of a mobile in a particular bin k with reference to a particular base station unit i may be expressed as $$ERP_{k,i} = S_i / PL_{k,i} \quad (3)$$

where the path loss $PL_{k,i}$ for a path from bin k to base station unit i may be defined as $$PL_{k,i} = Gm_k L_{k,i} Gb_{k,i} \qquad (4)$$

i.e. the product of the non-directional antenna gain Gm of a mobile unit in bin k, the path loss L between bin k and base station unit i (e.g. from the composite propagation loss matrix), and the directional antenna gain Gb of base station unit i in the direction of bin k. If the ERP is not greater than $P_{max}$, then it is presumed that a mobile unit transmitting at power $P_{max}$ from a position within bin k will be visible to base station unit i.

Although CDMA systems have particular advantages in TDOA measurement (due to their wide bandwidth and resistance to multipath interference, for example), problems may also arise due to the power control implemented in most such systems. In order to achieve maximum system capacity, it is important for the signals of all of the mobile units to be received at approximately the same power level. Therefore, a mobile unit close to its controlling base station unit will be instructed to reduce its power output. With respect to position location, however, this action has the undesirable effect of reducing the mobile unit's visibility to other base station units, creating the anomalous result that the position of the mobile unit becomes more difficult to determine as the mobile unit becomes closer to a base station unit.

For non-vital value-added consumer services, this result may be accepted as a consequence of maintaining system integrity for the majority of users. In certain situations such as emergencies, however, it may be desirable to allow the mobile unit to transmit at the maximum available power so that its position may be located, regardless of the effect on other traffic. This capability is included in section 6.6.4.1.7 of the IS95B standard as published by the Telecommunications and Electronics Industry Associations (TIA/EIA), Arlington, Va. Thus, it may be desirable to consider both types of mobile unit behaviors in a position location evaluation.

Forward Link Analysis

A system for terrestrial locating may also be evaluated by analyzing the forward link to determine, for example, whether the mobile unit is able to receive signals from the required number of base station units with sufficient strength. One useful measure for a CDMA system is the ratio (calculated for each base station unit and at each bin) of the pilot chip energy $E_c$ to the total input power spectral density $I_t$ $$\frac{E_c}{I_t} = \frac{p\varsigma L}{(N+I)B} \qquad (5)$$

where p is the total output of the base station unit's power amplifier, $\varsigma$ is the portion of the signal allocated to the pilot channel, L is the loss of the path between the base station unit and a position within this bin, N is the thermal noise power spectral density at the input to the mobile unit's low-noise amplifier (LNA), I is the power spectral density of the interference caused by other base station units, and B is the bandwidth of the mobile unit. If the value obtained for $E_c/I_t$ is greater than a predetermined threshold, then it is presumed that a pilot signal from that base station unit may be used for location of a position within this bin.

Error Analysis

For either forward or reverse link analysis, the accuracy of a located position will be affected by other factors besides the number of signals. Factors affecting position location accuracy on the reverse link, for example, may include TOA measurement errors due to noise, multipath interference, and quantization. For the forward link, factors affecting position location accuracy may include pilot phase measurement errors due to noise, multipath interference, and quantization. In addition to these measurement errors, uncertainties in the positions of the base stations ('position errors') and the transmit times of the signals will also affect the accuracy of a located position.

Measurement errors due to noise may be estimated by applying the Cramer-Rao lower bound on the variance of unbiased estimators. As measurement errors due to quantization may be reduced by increasing the sampling rate, an apparatus according to an embodiment of the invention may also support evaluations at different sampling rates over time and/or over space.

In an apparatus according to an embodiment of the invention, errors such as those described above may be condensed into ambiguity factor arrays for the reverse and forward link analyses. One example of a suitable ambiguity factor is the dilution of precision (DOP), which expresses the ratio between the position errors and the ranging error (which includes factors such as those noted above):

$$DOP = \sqrt{\sigma_x^2 + \sigma_y^2} / \sigma_s \qquad (6)$$

where $\sigma_x$ and $\sigma_y$ indicate the standard deviations of the x- and y-axis position errors and $\sigma_s$ indicates the standard deviation of the ranging error. Another suitable ambiguity factor is the geometric DOP (GDOP), which for three base station units $B_1$, $B_2$, and $B_3$ and a mobile unit M is calculated as:

$$GDOP = \frac{\sqrt{3 - \cos(\theta_2 - \theta_3) - \cos(\theta_2) - \cos(\theta_3)}}{|\sin(\theta_2 - \theta_3) - \sin(\theta_2) + \sin(\theta_3)|} \qquad (7)$$

where $\theta_2$ indicates the angle from $B_2$ to M to $\theta_3$ and $B_1$ indicates the angle from $B_3$ to M to $B_1$. Other suitable forms of ambiguity factors include position DOP (PDOP), horizontal DOP (HDOP), and time DOP (TDOP). An ambiguity factor array may be calculated to correspond to the representation of the target region (i.e. with one factor for each bin) or may be constructed differently (e.g. to have more detail in one portion of the region than another).

Satellite Simulation and Evaluation

As an alternative or as a complement to terrestrial techniques for determining position, satellite-based locating techniques may be used. One example of a system of positioning satellites suitable for use with such a technique is the NAVSTAR Global Positioning Satellite (GPS) system; another is the GLONASS GPS system. In each case, the mobile unit must have the additional capability to process or at least to acquire the signal transmitted by the positioning satellite. In one approach (i.e. stand-alone), the mobile unit calculates its own position and reports it to one or more of the base station units. In another approach (i.e. network-based), the mobile unit reports data related to signals received from the satellites, and the position of the mobile unit is determined by the base station units from this data. In a third approach (i.e. network-assisted), both the mobile unit and the base station units directly contribute to the location decision.

In evaluating a satellite-based approach, an apparatus according to one embodiment of the invention calculates the positions of all (or of a selected number of) GPS satellites over a predetermined period at a predetermined resolution (for example, at one-minute intervals over a one-week period). Such satellite position information may be computed using, for example, the algorithms and methods described in Section 2.5 ("User Algorithms") of the Global Positioning System Standard Positioning Service Signal Specification, $2^{nd}$ edition, Jun. 2, 1995.

An elevation mask angle may be selected (e.g. 5 degrees) to indicate that a satellite is presumed visible only if its elevation angle is higher than the elevation mask angle. For each bin (or, alternatively, for each bin that is determined to be visible by at least a predetermined number of base station units) at a particular time, the azimuth and elevation angle of each satellite is calculated for that bin, and it is determined whether the satellite is visible at that time. These angles may be computed using an algorithm such as the following:

1) Compute the latitude and longitude of the bin ($lat_u$ and $lon_u$, respectively), and also compute the coordinates of the bin in an Earth Centered Earth Fixed (ECEF) coordinate system ($x_u$, $y_u$, $z_u$).
2) Compute the factor R as $$R = \begin{bmatrix} -\sin(lon_u) & \cos(lon_u) & 0 \\ -\sin(lat_u)\cos(lon_u) & -\sin(lat_u)\sin(lon_u) & \cos(lat_u) \\ \cos(lat_u)\cos(lon_u) & \cos(lat_u)\sin(lon_u) & \sin(lat_u) \end{bmatrix} \quad (8)$$

3) Compute the factors east, north, and up as $$\begin{bmatrix} east \\ north \\ up \end{bmatrix} = R \times \begin{bmatrix} x_s - x_u \\ y_s - y_u \\ z_s - z_u \end{bmatrix}, \quad (9)$$

where $x_s$, $y_s$, $z_s$ are the ECEF coordinates of the satellite.
4) Compute the factor r as $$r = \sqrt{east^2 + north^2 + up^2}. \quad (10)$$

5) Compute the elevation angle of the satellite as $$\sin^{-1}\left(\frac{up}{r}\right) \quad (11)$$

and the azimuth angle of the satellite as $$\tan^{-1}\left(\frac{east}{north}\right), \quad (12)$$

where $\tan^{-1}$ indicates the four-quadrant inverse tangent function. If the elevation angle of the satellite is lower than the elevation mask angle, then it may be presumed that the satellite is not visible from this bin at this time. Otherwise, if the bin is in an open (i.e. non-urban) area, then the satellite may be presumed visible.

For bins that correspond to urban areas, topographical parameters such as building height, orientation of the street and street width may also be taken into account. One algorithm for predicting the visibility of satellites from urban locations is the following:

1) Calculate the elevation angle constraint l due to the building in the direction of the azimuth angle of the satellite as $$l = \text{abs}\left(\frac{0.5 \times \text{street\_width}}{\tan(azimuth)}\right) \quad (13)$$

if the orientation of the street is North-South, and as $$l = \text{abs}(0.5 \times \text{street\_width} \times \tan(azimuth)) \quad (14)$$

if the orientation of the street is East-West, where street_width is the width of the street and azimuth is the azimuth angle of the satellite.
2) Calculate the obstruction angle as $$\tan^{-1}\left(\frac{\text{bldg\_ht}}{\sqrt{(0.5 \times \text{street\_width})^2 + l^2}}\right), \quad (15)$$

where bldg_ht is the height of the building in the direction of the azimuth angle of the satellite. If the elevation angle of the satellite is greater than the obstruction angle, then the satellite may be presumed visible at this time. Otherwise, the line of sight to the satellite may be presumed to be blocked by buildings.

When such computations have been completed for each desired combination of satellite, time, and bin, the average number of satellites in view may be calculated for each bin at each time, along with an ambiguity factor such as DOP.

Evaluation of Hybrid Techniques

In an urban environment, a terrestrial approach to position location would be expected to perform better than a satellite-based approach. The accuracy of a satellite-based approach is degraded in urban environments because of tunnels, the limited angle of satellite visibility caused by the 'urban canyon' effect, and also because of multipath interference due to signal reflections. Even in non-urban environments, any overhead obstruction such as a tree canopy may tend to block the path between a satellite and a mobile unit.

In rural regions and other areas where the distance between base station units is greater, however, a terrestrial approach may fail because of the need for the mobile unit to be visible to several different base station units. Satellite-based approaches, on the other hand, tend to work very well in unobstructed, rural environments.

One possible solution to these problems is to merge a terrestrial solution with a GPS solution. Such a hybrid approach would enable position location of mobile units that are visible to fewer base stations than a terrestrial approach would require for position location and fewer GPS satellites than a GPS approach would require. In an apparatus according to one embodiment of the invention, the user may select and evaluate a hybrid approach by merging analysis and/or evaluation results relating to two or more of the other approaches described herein.

Evaluation and Display

Evaluation of the performance of a particular approach and comparisons between different approaches may include a consideration of one or more of the following factors:

Service availability: a measure of location determination failures or determinations having unacceptable accuracy. This measure may be characterized as the percentage of coverage (e.g. in terms of area or number of subscribers) where location services can be supported with acceptable accuracy.

Coverage: may be defined in terms of geography (e.g. area) or demographics (e.g. customers or land use) or some combination of such features.

Accuracy: a measure of the uncertainty of the indicated position (e.g. in meters RMS or cumulative distribution).

Delay: a measure of the minimum time required to locate a position.

Capacity: a measure of the number of requests that may be serviced and the rate at which positions may be updated.

Reliability: a measure of the system's availability.

Signaling complexity: a measure of the complexity of the mechanism whereby a located position is reported.

Administration: a measure of the complexity and costs associated with the maintenance and operation of the position location system.

Once a particular evaluation has been completed, the results are ready for display or storage. In an apparatus according to one embodiment of the invention, a map of the target region is displayed which may be color-coded to indicate, for example, the solution method applied or the number of base station units and/or satellites that are visible at each bin. Other information displayed may include the percentage of mobile units whose positions can be located and the expected location accuracy at each bin. Evaluation information and/or the results of statistical analyses of such information may also be stored for offline or future use, transmittal, or analysis.

Useful statistical information for terrestrial system evaluations may include the number of base station units seen, the signal strength, the signal-to-noise ratio, the percentage of bins that can see N base station units (where N is some predetermined number), the percentage of bins that can see at most N base station units, the percentage of mobile units that can see N base station units, and the percentage of mobile units that can see at most N base station units. For satellite system evaluations, useful statistical information may include the number of satellites seen, the signal-to-noise ratio, the elevation angle, the Doppler shift, the percentage of bins that can see N satellites (where N is some predetermined number), the percentage of bins that can see at most N satellites, the percentage of mobile units that can see N satellites, and the percentage of mobile units that can see at most N satellites.

Implementations

FIG. 1 shows an apparatus according to one embodiment of the invention in modular form. As discussed above, the apparatus includes a propagation loss matrix M10, demand vector M50, a topological database M20, and a GPS simulation engine M30. These resources are accessed in module M40 to perform evaluations of selected terrestrial locating systems and in module M60 to perform evaluations of selected satellite-based locating systems. Results of such evaluations may be combined in module M70 to yield an evaluation of a selected hybrid locating system. As discussed above, a structured collection of information may contain one or more among propagation loss matrix M10, topological database M20, and demand vector M50, while the operations of modules M30, M40, M60, and M70 may be performed by one or more processing units such as microprocessors or similar arrays of logic elements.

Particular implementations of the apparatus may vary widely. In one implementation, only terrestrial locating systems may be supported, and modules M30, M60, and M70 may be eliminated. Conversely, another implementation may support only satellite-based locating systems, in which case modules M10, M40, and M70 may be omitted. Demand vector M50 may be unnecessary for some applications. Similarly, one among the forward link and reverse link analyses in module M40 may be deleted for some applications.

Figure 2:
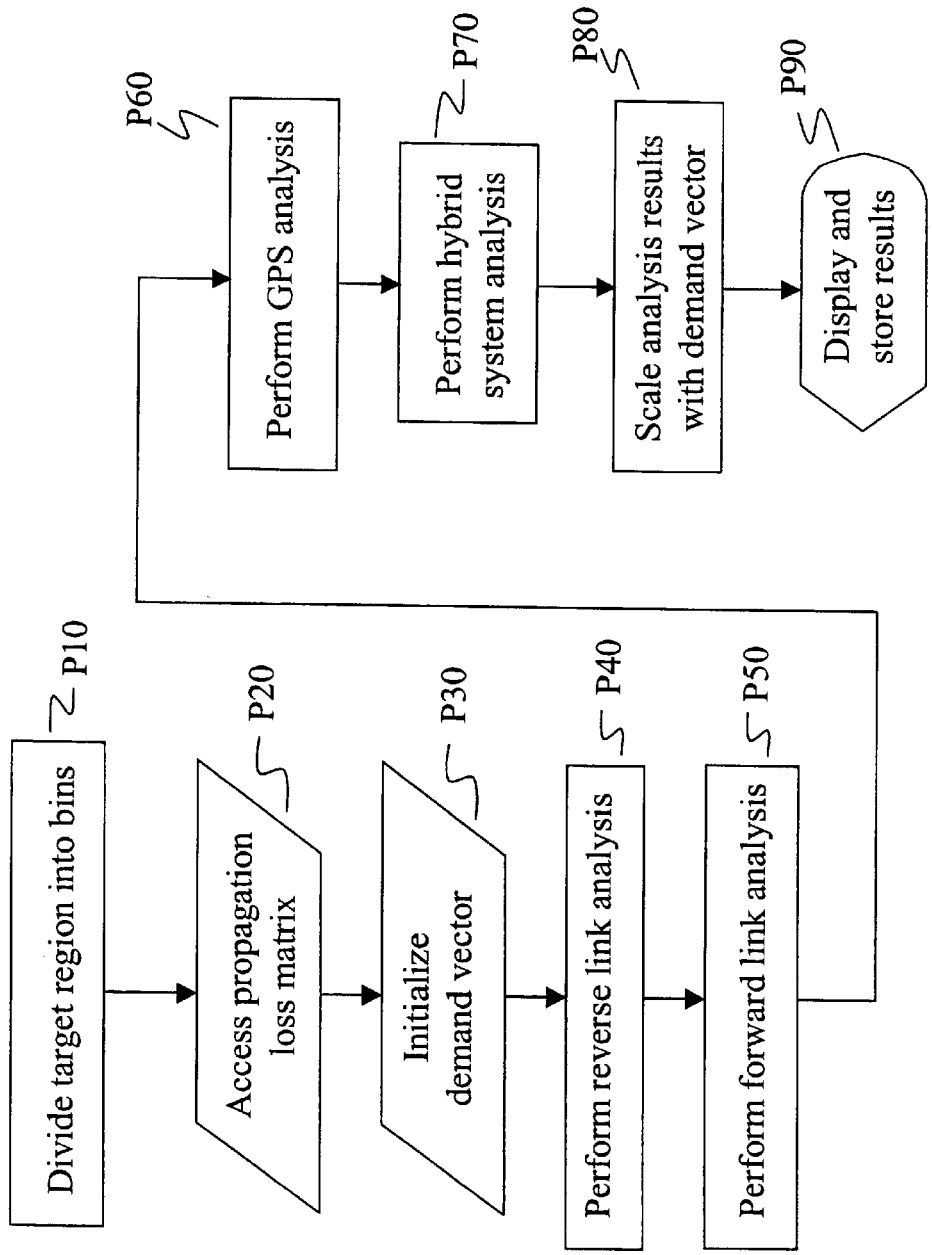
FIG. 2 is a flow chart of a method according to an embodiment of the invention.

FIG. 2 shows a method according to an embodiment of the invention. In task P10, the target region is divided into bins. This task may include generating or loading a representation of the target region as described above. In task P20, a propagation loss matrix for the target region is accessed. Again, this matrix may be generated locally or loaded from storage.

In task P30, a demand vector is initialized. As mentioned above, this vector may be loaded from storage or generated from information such as land-use maps, network use records, etc. Note that because the demand vector is used to scale the analysis results, this task may be delayed until such results become available. In a more limited implementation, this task may be omitted.

Figure 3:
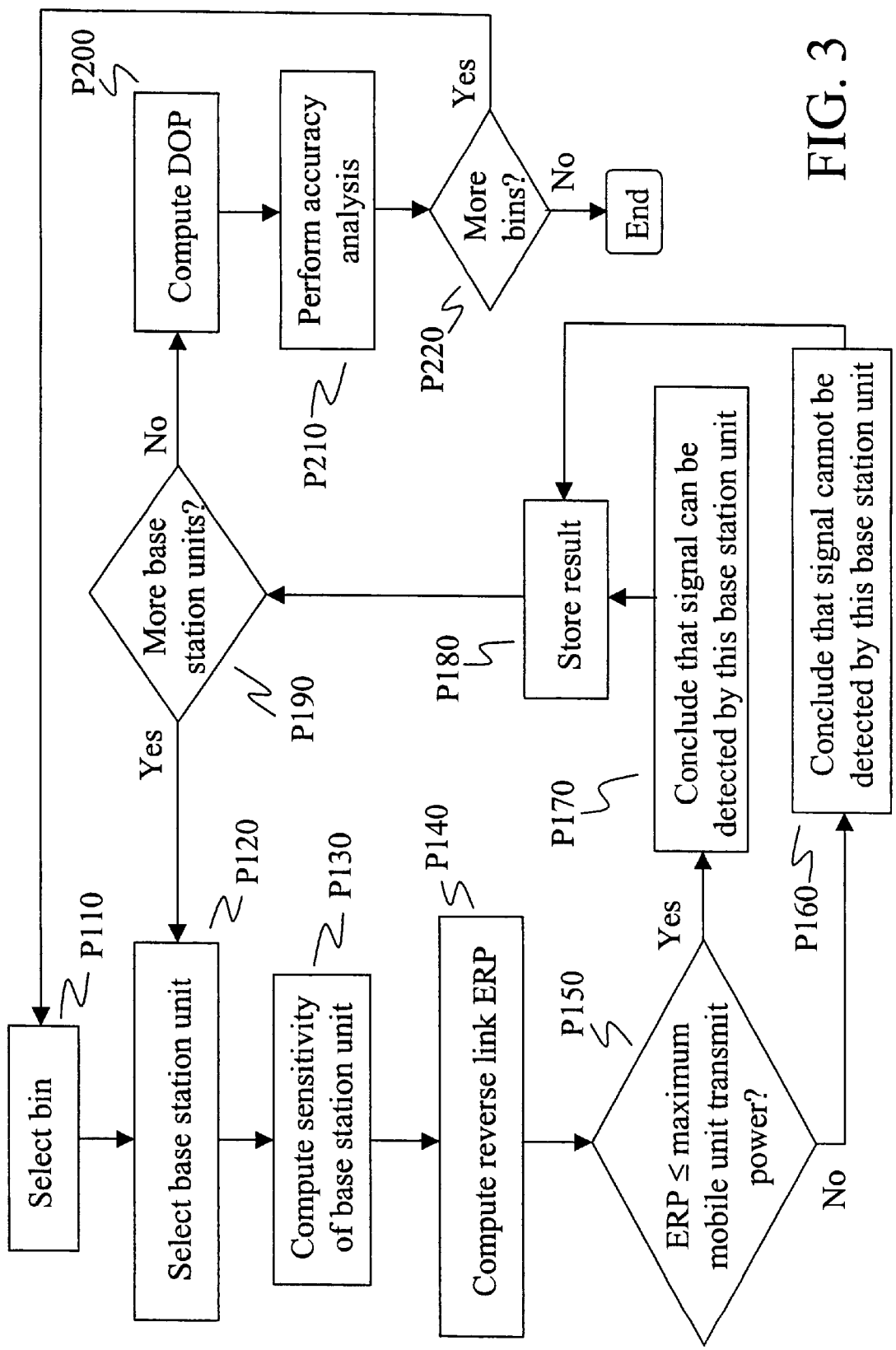
FIG. 3 is a flow chart of a reverse link analysis using effective radiated power (ERP) computation.

A reverse link analysis is performed in task P40. For an analysis using ERP(effective radiated power) computation, this task is presented in more detail in FIG. 3. A particular bin and base station unit are selected in subtasks P110 and P120, respectively, and the sensitivity of this base station unit is computed in subtask P130 using, e.g., expression (1) above (alternatively, this value may be loaded from storage or another source). The ERP of a mobile unit at this bin is computed in subtask P140 using, e.g., expressions (3) and (4) above. If in subtask P150 the ERP is found to be greater than the mobile unit's maximum transmit power (or some other threshold), then it is concluded that the signal cannot be detected by the base station unit (i.e. that the mobile unit is not visible to this base station unit) (subtask P160). Otherwise, the mobile unit is presumed visible to this base station unit (subtask P170). In subtask P180, the results of subtask P160 or P170 are stored.

In subtask P190, the next base station unit to be considered is selected. Note that results need not be computed for base station units to which a mobile unit at the selected bin would not be visible due to, for example, distance, a blocking land formation or building, a jammer or other source of interference, etc.

In subtask 200, one or more ambiguity factors are computed for the location of the selected bin as determined by the method under test. These factors may include DOP (which may be calculated according to expression (6) above) or GDOP (which may be calculated according to expression (7) above). Note that if it is determined that a mobile unit at this bin would be visible to less than a predetermined number (e.g. three) of base station units, the bin may be designated as nonlocatable and subtasks P200 and P210 may be skipped. In the accuracy analysis of subtask P210, the ambiguity factors are used (in conjunction with any other known or estimated errors) to determine the expected accuracy of a position location result for a mobile unit at this bin. In subtask P220, the task is restarted for the next bin; if no more bins remain, the task ends.

Figure 4:
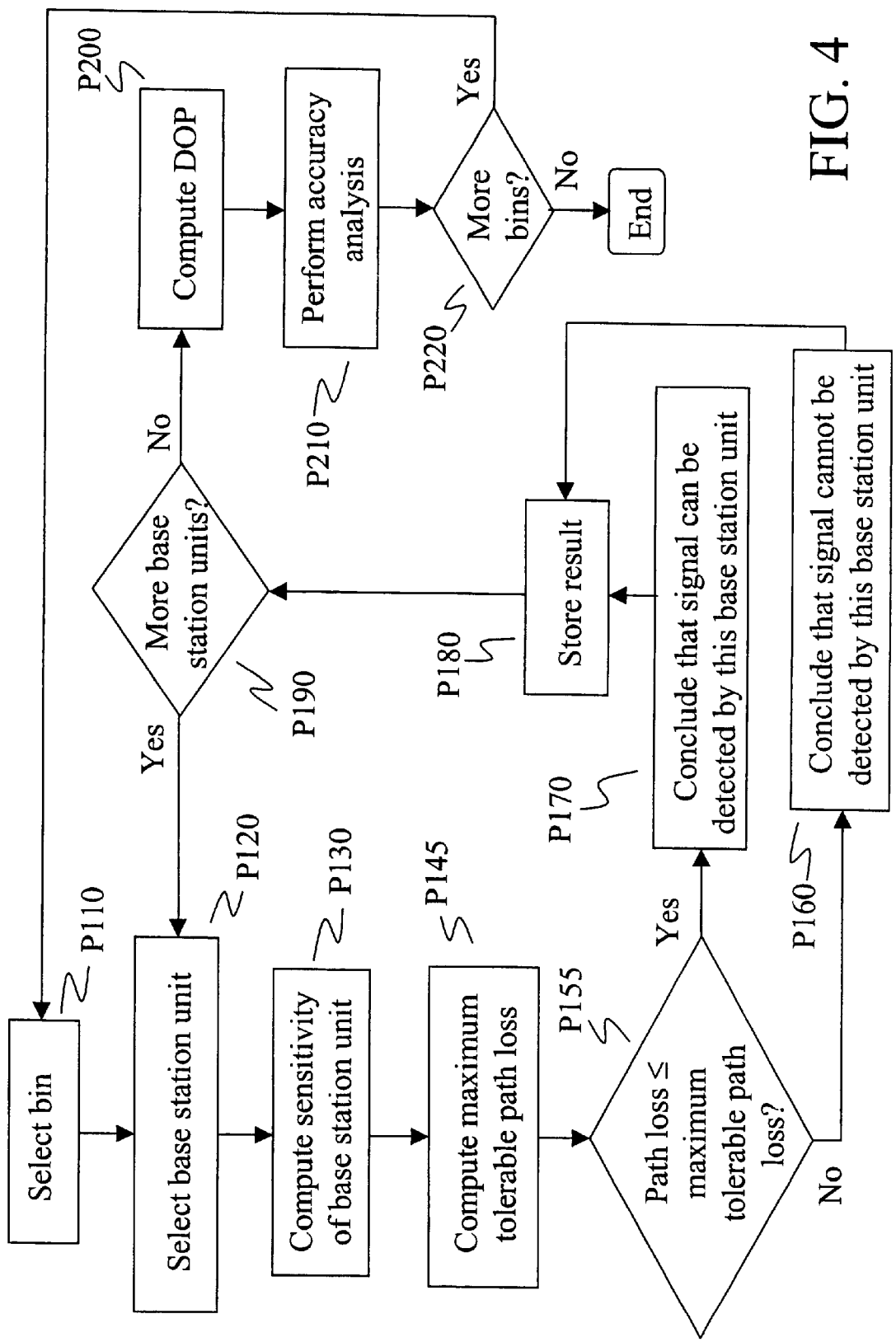
FIG. 4 is a flow chart of a reverse link analysis using maximum tolerable path loss computation.

FIG. 4 shows the subtasks that may be performed in task P40 for a reverse link analysis using the criterion of maximum path loss rather than ERP. These subtasks may be the same as those shown in FIG. 3 and discussed above, except that (a) a computation in subtask P145 of maximum tolerable path loss (according to, e.g., expression (2) above) replaces computation subtask P140 and (b) a comparison in subtask P155 of this value to the path loss for a path from a mobile unit in this bin to the selected base station unit (according to, e.g. expression (4) above) replaces test subtask P150.

Figure 5:
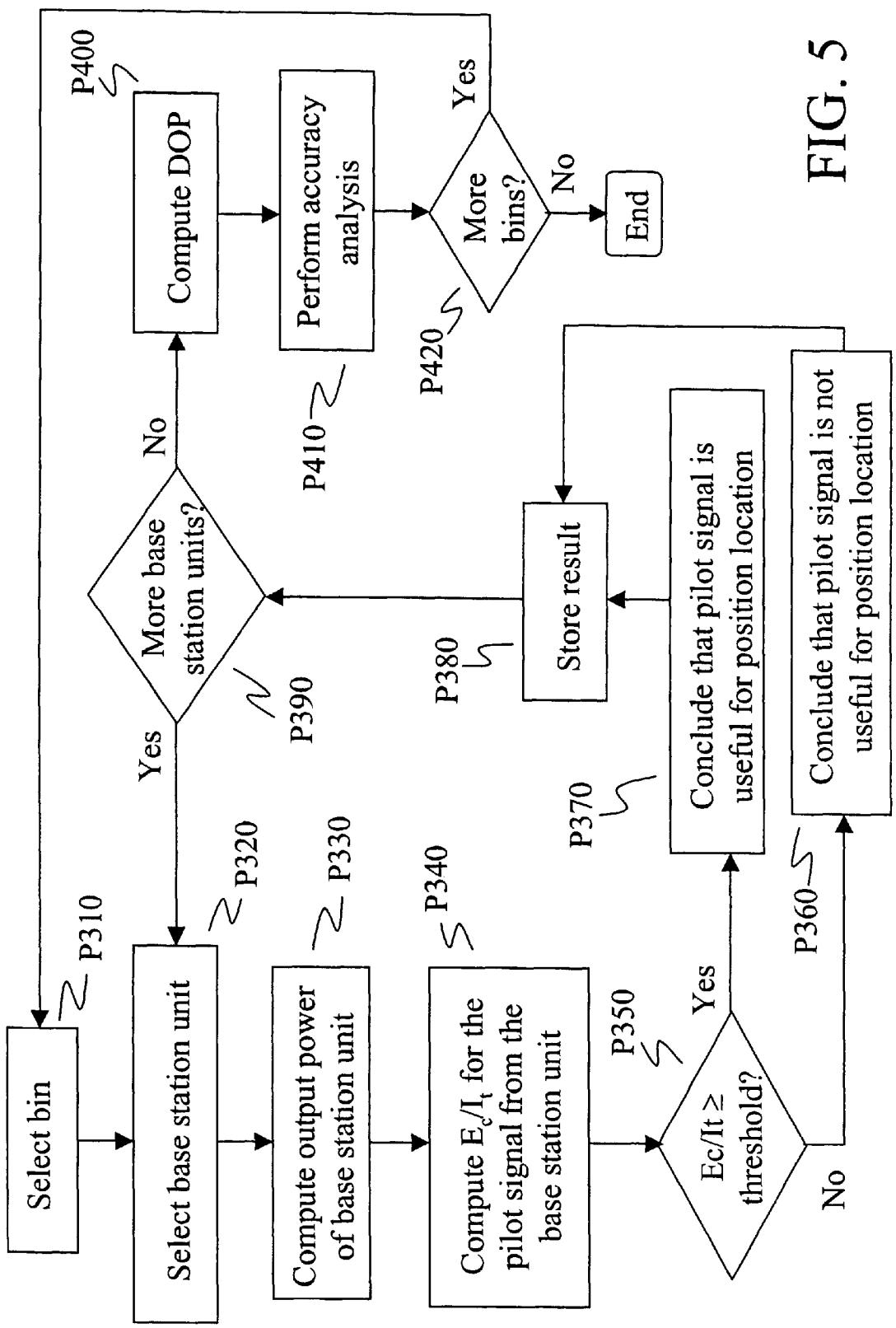
FIG. 5 is a flow chart of a forward link analysis.

A forward link analysis is performed in task P50, and FIG. 5 shows this task in more detail. Many of the subtasks in this figure (i.e. subtasks P310, P320, P380, P390, P400, P410, and P420) perform operations analogous to corresponding subtasks in FIGS. 3 and 4 above (i.e. subtasks P110, P120, P180, P190, P200, P210, and P220, respectively). In subtask P330, the power of the signal outputted by the selected base station unit is computed (or loaded). In subtask P340, the value of the ratio $E_c/I_t$ is computed according to, e.g., expression (5) above. If this value is determined in test subtask P350 to be not less than a predetermined threshold, then it is concluded in subtask P370 that the pilot signal is useful for position location. Otherwise, it is concluded in subtask P360 that the pilot signal is not useful for position location.

Figure 6:
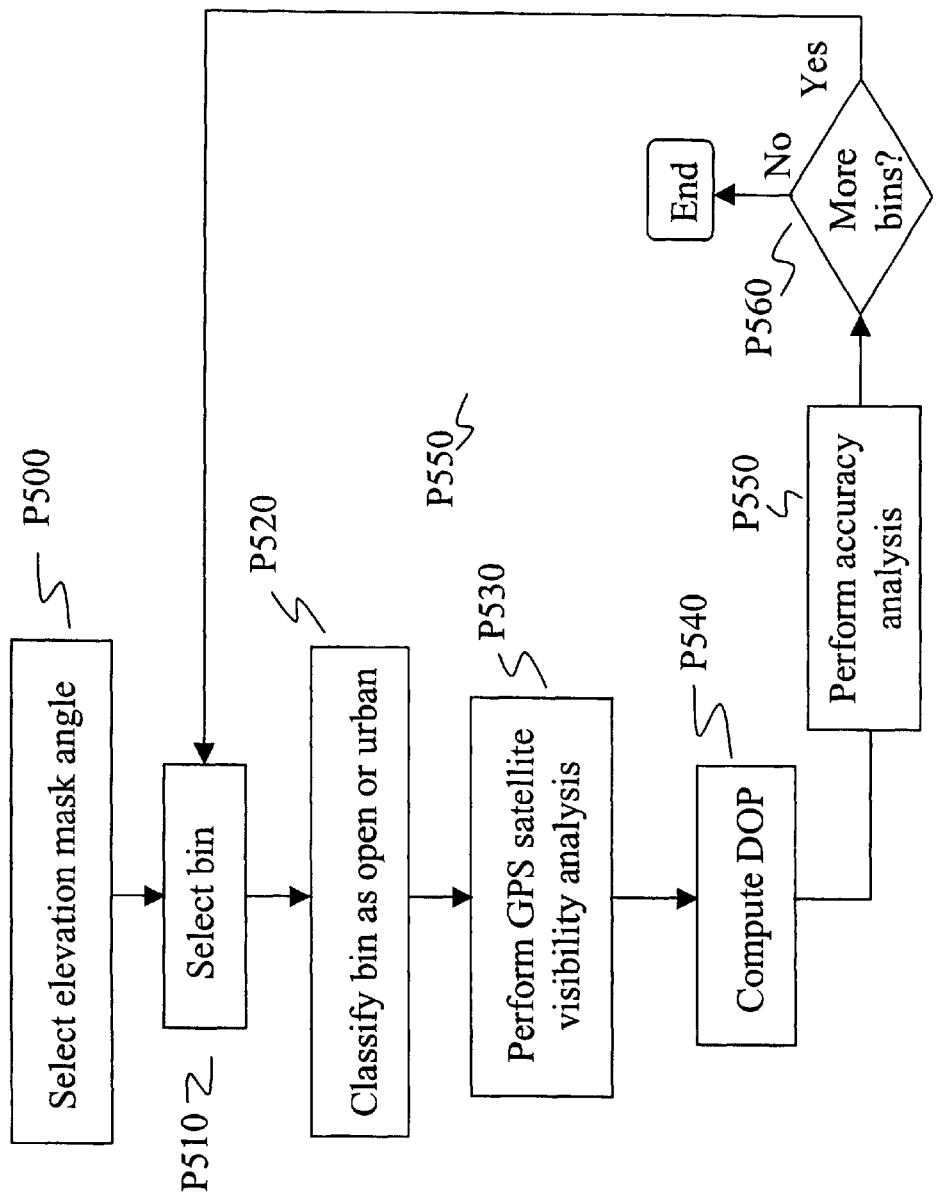
FIG. 6 is a flow chart of an analysis of a satellite-based locating system.

In task P60, a satellite analysis is performed. This task is illustrated in more detail in FIG. 6. An elevation mask angle is selected in subtask P500 and a bin is selected in subtask P510. In subtask P520, the selected bin is classified as open or urban, depending on such factors as nearness to buildings or other structures, population density, etc.

Figure 7:
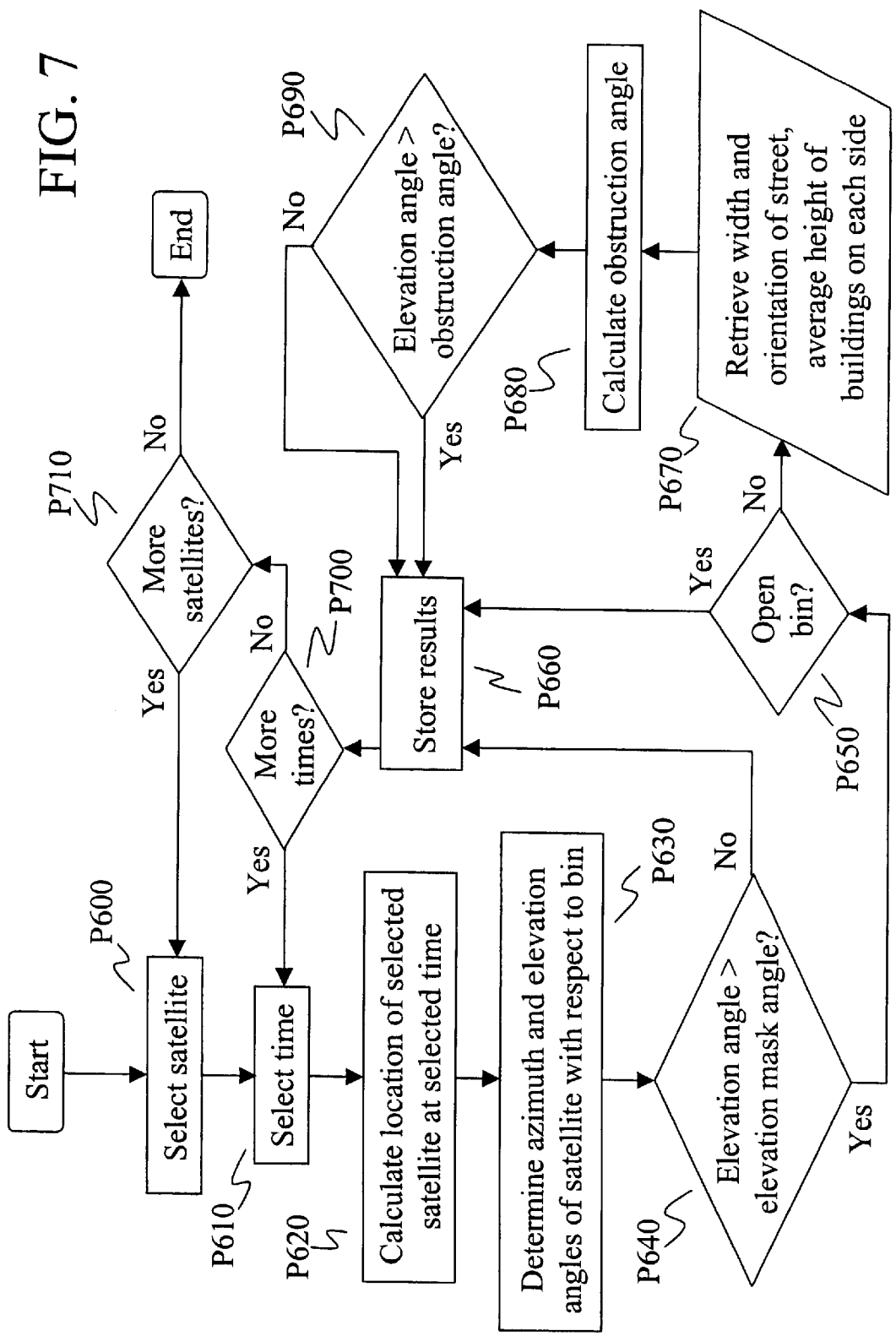
FIG. 7 is a flow chart of a satellite visibility analysis.

In subtask P530, a satellite visibility analysis is performed as detailed, for example, in FIG. 7. In subsubtasks P600 and P620, a particular satellite and time are selected. The position of the selected satellite at the selected time is calculated in subsubtask P620 according to, for example, Section 2.5 of the GPS Specification as referenced above. In subsubtask P630, the azimuth and elevation angles of the satellite with respect to the selected bin are calculated according to, e.g., expression (11) and (12) above.

In subsubtask P640, the elevation angle and the elevation mask angle are compared. (Note that it is not strictly necessary to compute the azimuth angle until the results of this test are known.) If the elevation angle is not greater than the elevation mask angle, then it may be presumed that the satellite is not visible, and this result is stored in subsubtask P660. Otherwise, the classification of the bin is referenced in subsubtask P650. If the bin was classified as open, then the satellite may be presumed visible at that bin, and this result is stored in subsubtask P660.

If the test of subsubtask P650 determines that the selected bin is classified as urban, then urban parameters relating to the bin (such as street width and orientation and the average height of buildings on each side of the street) are retrieved in subsubtask P670. In subsubtask P680, the obstruction angle of the bin is calculated according to, e.g., expression (15) above. If test subsubtask P690 determines that the elevation angle of the satellite exceeds the obstruction angle of the bin, then the satellite may be presumed visible, and this result is stored in subsubtask P660. Otherwise, the satellite may be presumed not visible, and this result is stored. Test subsubtasks P700 and P710 cause the subtask to repeat for the next time or satellite until such choices are exhausted and the subtask ends. In this way, results and statistics regarding the number of satellites visible from each bin at any specified time may be determined.

In subtask P540, one or more ambiguity factors are computed for the location of the bin as determined by the method under test. (Note that subtasks P540 and P550 need not be performed if it has been determined that fewer than a predetermined minimum number of satellites are visible from the selected bin.) The factors may include a DOP factor such as horizontal DOP (quality of latitude and longitude data), vertical DOP (quality of elevation data), position DOP (quality of three-dimensional measurement), time DOP (quality of time determination), geometric DOP (quality of three-dimensional measurement including time determination), or relative DOP (quality of measurement normalized to a period of time, such as 60 seconds). In subtask P560, the accuracy of the satellite-based locating system under test may be predicted by taking into account one or more of the following factors, in addition to the number of satellite signals visible at the selected bin and the DOP statistics at that bin:

Pseudo-range measurement errors due to noise. The Cramer-Rao bound may be used to perform this analysis.
Pseudo-range measurement errors due to multipath interference.
Pseudo-range measurement errors due to quantization.
Errors due to residual ionospheric and tropospheric delays.
Residual selective availability errors.

If test subtask P560 indicates that more bins remain to be processed, then the task begins again at subtask P510. Otherwise, task P60 ends, and analysis of any hybrid systems whose evaluation may be desired is performed in task P70. In task P80, the results of the analyses of tasks P40, P50, P60, and/or P70 are scaled by application of the demand vector, and the results are displayed, stored, and/or transmitted in task P90.

In many cases, operations may be performed in parallel or in different loop orders than those explicitly shown herein. For example, position information for all satellites at all times may be computed in one batch (in an exemplary implementation, time is divided into intervals of one minute, and the satellite position calculation extends over a period of one week). Alternatively, location information for one satellite over all bins at all times may be processed and exhausted before location information for the next satellite is prepared.

The foregoing description of the preferred embodiments is provided to enable any person skilled in the art to make or use the present invention. Various modifications to these embodiments are possible, and the generic principles presented herein may be applied to other embodiments as well. For example, it should be noted that once a capability for accurate position location has been added to ensure compliance with regulations such as those discussed above, additional features related to position location may be added inexpensively that promote cost reduction and revenue generation, such as the following examples:
Location sensitive billing
Emergency management
Fraud detection and management
Law enforcement tracking
Fleet management
Inventory monitoring
Network optimization
An embodiment of the invention may therefore include an evaluation or cost-benefit analysis with regard to such services.

Additionally, an apparatus according to an embodiment of the invention may function as a dedicated unit, or a method according to an embodiment of the invention may be implemented in software that allows a general-purpose microcomputer, workstation, or server to perform in an analogous fashion. Therefore, the invention may also be embodied as a data storage medium having machine-readable code stored thereon, the machine-readable code comprising instructions executable by an array of logic elements such as a microprocessor or other digital signal processing device. Thus, the present invention is not intended to be limited to the embodiments shown above but rather is to be accorded the widest scope consistent with the principles and novel features disclosed in any fashion herein.

In a further application of a method or apparatus according to an embodiment of the invention, the signaling traffic within a position location system is projected in order to evaluate the processing requirements of the system. In one example, a module (which may be implemented in hardware and/or in software) predicts such statistics as the number of messages expected to pass between the mobile units and the server that calculates their positions. These statistics may be used by the module or by another device to evaluate such features as the required capacity of the system (i.e. how many position location requests may be pending within the system at a given moment) and/or the minimum throughput of the system (i.e. how many position location requests the system must be able to process in a given period).

A method or apparatus according to an embodiment of the invention may also be refined by using calibration and/or updating techniques to validate the prediction models used to estimate such parameters as signal levels and TDOA measurements. In one example, actual measurements of these parameters are used as baselines for adjusting and refining the models.

In a further application of a method or apparatus according to an embodiment of the invention, the method or apparatus is used to support actual or simulated position location of a mobile unit. In one example, a vector of measurements is matched to a bin within the target region. This vector of measurements may be reported by an actual mobile unit or may be outputted by a simulated mobile unit.

I claim:

1. An apparatus comprising:
   a structured collection of information relating at least in part to a target region;
   at least one processing unit;
   wherein the at least one processing unit processes at least a portion of the structured collection of information and produces further information;
   wherein the further information relates at least in part to a predicted position location performance of at least one system for locating a position of a wireless unit within the target region; and
   wherein the further information includes an evaluation of the predicted position location performance based upon performance criteria, the performance criteria including at least one among a percentage of the target region wherein positions may be located to an acceptable degree of accuracy, an area of uncertainty associated with a located position, a minimum time required to locate a position, a number of requests for position location that may be serviced, a rate at which position location determinations may be updated, and a cost associated with position location.

2. An apparatus comprising:
   a structured collection of information relating at least in part to a target region;
   at least one processing unit;
   wherein the at least one processing unit processes at least a portion of the structured collection of information and produces further information;
   wherein the further information relates at least in part to a predicted position location performance of at least one system for locating a position of a wireless unit within the target region;
   wherein the structured collection of information comprises at least one among topological information relating to the target region, demographic information relating to the target region, and information relating to distribution of a population within the target region; and
   wherein the structured collection of information includes a demand vector, each element of the demand vector corresponding to at least one of the plurality of bins.

3. The apparatus according to claim 2, wherein the demand vector is based at least in part on at least one among a custom demand map, a land-use map, a population density map, and demographic information.

4. An apparatus comprising:
   a structured collection of information relating at least in part to a target region;
   at least one processing unit;
   wherein the at least one processing unit processes at least a portion of the structured collection of information and produces further information;
   wherein the further information relates at least in part to a predicted position location performance of at least one system for locating a position of a wireless unit within the target region;
   wherein the structured collection of information comprises at least one among topological information relating to the target region, demographic information relating to the target region, and information relating to distribution of a population within the target region; and
   wherein the structured collection of information includes a representation of the target region, the representation of the target region comprising a plurality of bins, each bin corresponding to one among an area element and a volume element of the target region.

5. The apparatus according to claim 4, wherein the predicted position location performance includes values corresponding to each of at least a portion of the plurality of bins, each of the values relating to a location of a position of a wireless unit within the corresponding bin.

6. The apparatus according to claim 4, wherein the structured collection of information includes a propagation loss matrix, each element of the propagation loss matrix corresponding to one or more of the plurality of bins.

7. The apparatus according to claim 6, wherein the values of each of the elements of at least a portion of the propagation loss matrix are based on at least one among a path loss model and a diffraction loss model.

8. The apparatus according to claim 7, wherein the path loss model includes at least one among a free-space loss model, a short-term model, and a long-term model.

9. The apparatus according to claim 6, wherein the at least one system for determining a position of a wireless unit within the target region includes a terrestrial locating system, said terrestrial locating system comprising a plurality of base stations.

10. The apparatus according to claim 9, wherein the terrestrial locating system includes at least one among an overlay infrastructure-based system and an integrated infrastructure-based system.

11. The apparatus according to claim 9, wherein the terrestrial locating system determines the position of the wireless unit at least on the basis of a time difference of arrival of a signal from the wireless unit.

12. The apparatus according to claim 9, wherein at least a portion of the predicted position location performance is obtained at least in part using a forward link analysis.

13. The apparatus according to claim 9, wherein at least a portion of the predicted position location performance is obtained at least in part using a reverse link analysis.

14. The apparatus according to claim 13, wherein the reverse link analysis is based at least in part on an effective radiated power of the wireless unit.

15. The apparatus according to claim 13, wherein the reverse link analysis is based at least in part on a maximum tolerable path loss between the specified one of the plurality of bins and at least one of the plurality of base station units.

16. The apparatus according to claim 9, wherein the predicted position location performance includes an analysis of errors relating to position location, the errors relating to position location including at least one among errors due to noise, errors due to multipath interference, and errors due to quantization.

17. The apparatus according to claim 16, wherein the errors relating to position location include at least one among uncertainty in the position of at least one of the plurality of base station units and uncertainty in the transmit time of a signal from the wireless unit.

18. The apparatus according to claim 16, wherein the analysis of errors relating to position location includes the calculation of at least one ambiguity factor, the at least one ambiguity factor including at least one among dilution of precision (DOP), geometric DOP, position DOP, horizontal DOP, and time DOP.

19. The apparatus according to claim 6, wherein the at least one system for determining a position of a wireless unit within the target region comprises a satellite-based locating system.

20. The apparatus according to claim 19, wherein the satellite-based locating system includes one among a stand-alone mobile-unit-based system, a network-assisted system, and a network-based system.

21. The apparatus according to claim 19, wherein the satellite-based locating system receives signals from satellites of at least one among the NAVSTAR and the GLONASS Global Positioning Satellite systems.

22. The apparatus according to claim 19, wherein the predicted position location performance is based at least in part upon a calculation of the positions of a plurality of satellites in a Global Positioning Satellite system at specified times.

23. The apparatus according to claim 19, wherein the predicted position location performance is based at least in part on the visibility of a plurality of satellites in a Global Positioning Satellite system at a specified bin.

24. The apparatus according to claim 19, wherein the predicted position location performance includes an analysis of errors relating to position location, wherein the errors relating to position location include at least one among errors due to noise, errors due to multipath interference, and errors due to quantization.

25. The apparatus according to claim 24, wherein the errors relating to position location include at least one among errors associated with atmospheric conditions and errors associated with selective availability.

26. The apparatus according to claim 24, wherein the analysis of errors relating to position location includes the calculation of at least one ambiguity factor, the at least one ambiguity factor including at least one among dilution of precision (DOP), geometric DOP, position DOP, vertical DOP, horizontal DOP, time DOP, and relative DOP.

27. The apparatus according to claim 6, wherein at least one system for determining a position of a wireless unit located within the target region comprises a hybrid locating system, wherein the hybrid locating system includes at least a portion of a terrestrial locating system and at least a portion of a satellite-based locating system.

28. An apparatus comprising:

a topological database;

a propagation loss matrix; and at least one processing unit, wherein the topological database relates at least in part to a target region, and wherein each among at least a portion of the elements of the propagation loss matrix represents a path loss between positions in the target region, and wherein the at least one processing unit performs at least one among a forward link analysis and a reverse link analysis, at least one link analysis being based at least in part on information from the topological database and information from the propagation loss matrix, and wherein the at least one processing unit outputs information relating to a predicted position location performance of a wireless unit locating system with respect to the target region.

29. The apparatus of claim 28, wherein the processing unit calculates the positions of a plurality of global positioning satellites at a plurality of times, and wherein the processing unit performs a satellite visibility analysis.

30. The apparatus of claim 28, wherein the processing unit outputs information relating to a predicted position location performance of a hybrid locating system.

31. The apparatus of claim 28, the apparatus further comprising a demand vector, at least one link analysis being based at least in part on information from the demand vector.

* * * * *